G. M. EATON.
FLEXIBLE COUPLING.
APPLICATION FILED NOV. 4, 1918.

1,390,514.

Patented Sept. 13, 1921.
3 SHEETS—SHEET 1.

WITNESSES:
J. P. Wurmb
D. C. Davis

INVENTOR
George M. Eaton.
BY
Wesley Carr
ATTORNEY

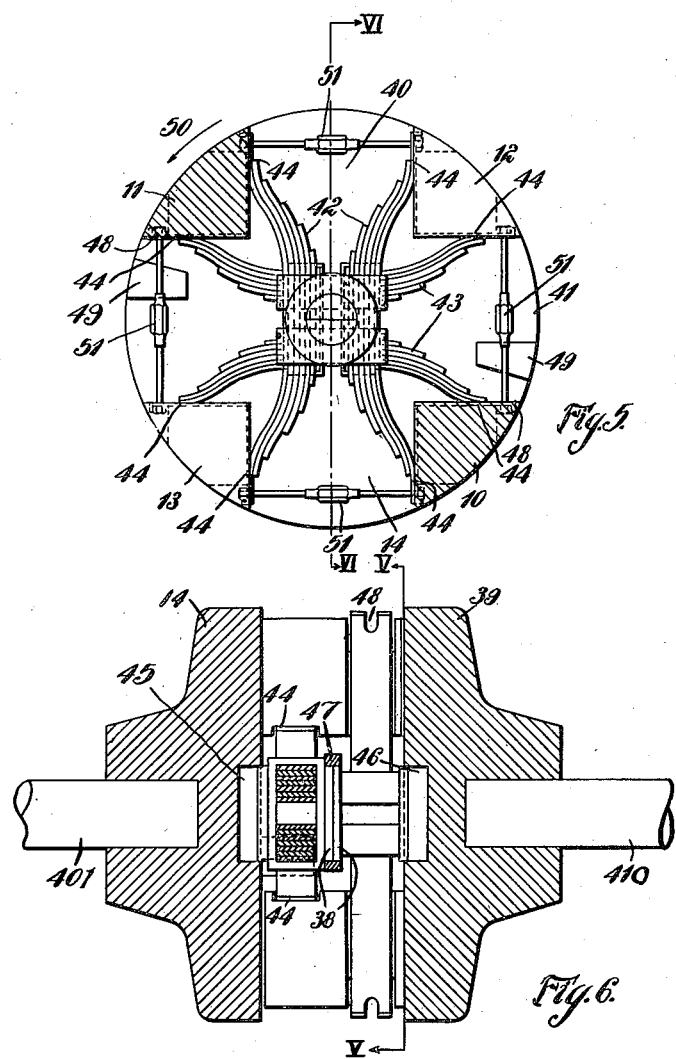

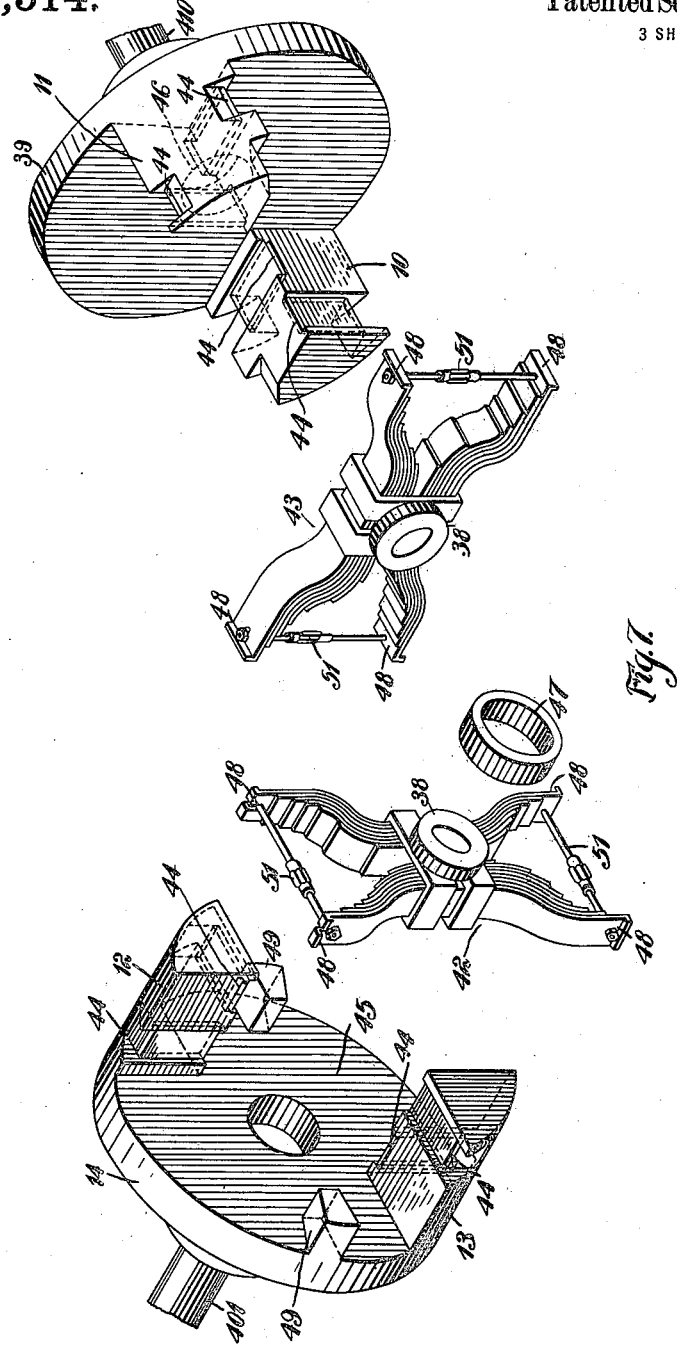

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

FLEXIBLE COUPLING.

1,390,514.           Specification of Letters Patent.      Patented Sept. 13, 1921.

Application filed November 4, 1918. Serial No. 260,959.

*To all whom it may concern:*

Be it known that I, GEORGE M. EATON, a citizen of the United States, and a resident of Pittsburgh, in the county of Allegheny and State of Pennsylvania, have invented a new and useful Improvement in Flexible Couplings, of which the following is a specification.

My invention relates to flexible couplings for the mechanical interconnection of rotatable elements, such, for example, as shafts or axles, and it has for its object to provide a device of the character designated that shall be simple, rugged, inexpensive in construction and long lived and effective in operation.

Figure 1:
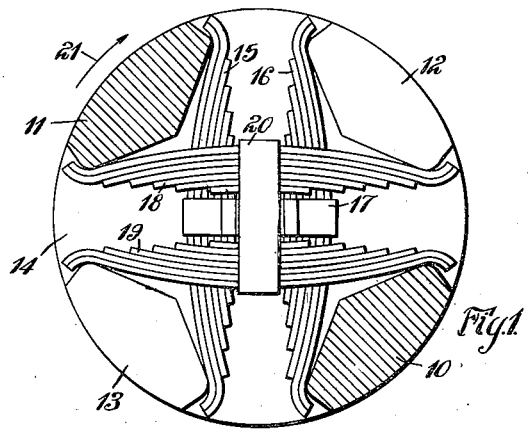
Figure 2:
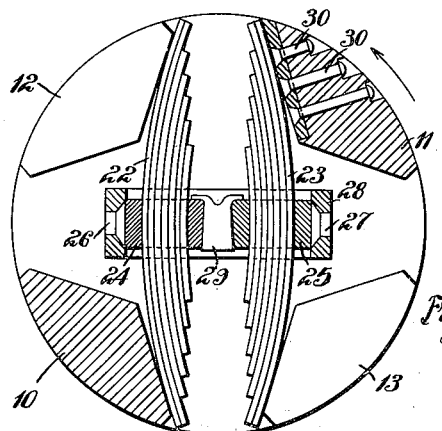
Figure 3:
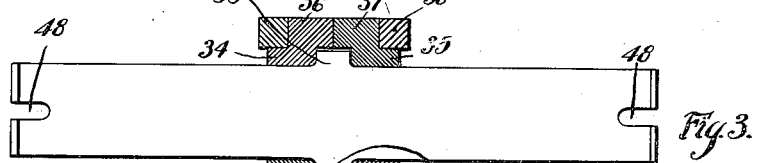
Figure 4:
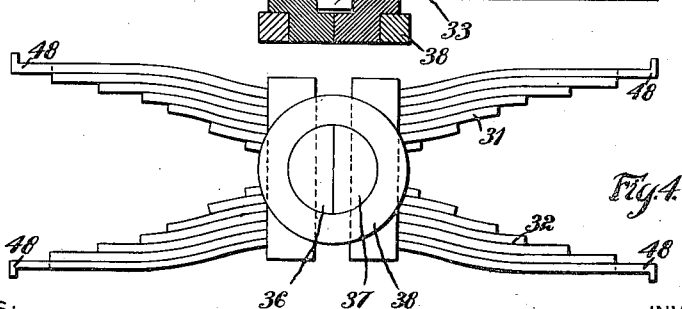

In the accompanying drawing, Figure 1 is an end view, partially in section and partially in elevation, of a coupling embodying one form of my invention; Fig. 2 is a view similar to Fig. 1 and illustrating a modification in the structure thereof; Figs. 3 and 4 are plan and side views, respectively, of a preferred form of spring element particularly adapted for high-speed operation; Fig. 5 is a view similar to Fig. 1 and illustrating the application of the springs shown in Figs. 3 and 4; Fig. 6 is a side view, partially in side elevation, of the structure shown in Fig. 5; and Fig. 7 is an exploded perspective view of the structure shown in Figs. 5 and 6.

In the construction of a flexible coupling, it is essential that the resilient members, of whatever form, be of simple and inexpensive nature, so that the expense of replacement thereof shall not be excessive and, furthermore, these members should be readily removable for inspection or replacement. Moreover, it is desirable that the resilient members employed be rather large in size so as to permit appreciable deflection without overstraining, and means should be provided whereby, if the load is such as would overstrain the resilient member, a positive stop will come into action to prevent the imposition of further load upon the resilient members.

With the above and other objects in view, I have devised a flexible coupling wherein the two opposed coupling members are provided with lugs on their opposing faces, said lugs overlapping each other but in relatively spaced relation so as to provide diametral passages through the coupling structure, there being a lug on each coupling member on each side of each end of each passage. I then place resilient members comprising two double cantaliver leaf springs, mounted in back-to-back relation, in each of these passages, so that, upon driving one of the coupling members, the two cantalivers of a given spring unit react against each other and transmit the energy.

It will be noted that the spring units thus employed are equal in length to the entire diameter of the coupling structure, thus permitting the use of long springs. Furthermore, the spring units are relatively simple and inexpensive in construction and may be readily removed from the passages in which they are placed.

Still other structural features of my invention will be apparent from the subjoined description.

Referring to Fig. 1 of the drawing for a detailed understanding of my invention, the driving coupling member is assumed to be toward the observer and to be cut away, with the exception of the lugs 10 and 11, extending in overlapping relation to lugs 12 and 13 on the driven coupling member 14.

A double cantaliver spring 15 is mounted in back-to-back relation to a cantaliver spring 16 by a suitable binding member 17 and the two cantaliver springs thus joined frictionally engage the lugs 10—11—12—13, as indicated. In like manner, double cantaliver spring members 18 and 19 are joined by a binder 20 and engage the remaining faces of the lugs 10 to 13, inclusive.

It should be particularly noted that the point of engagement of a given cantaliver spring with a lug is near the tip of said spring under light load, the face of the lug diverging from the face of the spring under these conditions. Considering the upper half of the spring 15 and the driving lug 11 as moving in a clockwise direction, as indicated by an arrow 21, it will be noted that the effect of greater and greater deflection of the spring 15 is to cause the face of said spring to roll on the face of the lug 11, the point of bearing gradually approaching the center of the spring, so that, as the load increases, the spring action is stiffer and stiffer, as is desirable for operating reasons.

Turning now to the action of the spring mechanism as a whole, assuming the lugs 10 and 11 to be driving in a clockwise direction, it will be noted, first of all, that the upper halves of the springs 15 and 16, together with the binder, form a U-shaped spring mounted between the lugs 11 and 12 and driving the lug 12 from the lug 11 by compression. At the same time, considering the center of the spring 16 as a fulcrum against which the center of the spring 15 is bearing, it will be noted that the lug 11 is driving the lug 13 by double cantaliver action. Thus, the lug 11 drives both the lug 12 and the lug 13 and, likewise, the lug 10. The springs 18 and 19 are not operating under the conditions assumed but come into action if the direction of drive in the lugs 10 and 11 is reversed or if the lugs 12 and 13 become the driving lugs in a clockwise direction.

With the structure shown in Fig. 1, it is difficult to remove the spring elements except by longitudinal displacement of the coupling members in the directions of their attached shafts and this is difficult in many cases, as where the flexible coupling is mounted between two large and heavy machines. It, therefore, becomes desirable to adopt a structure, such as that shown in Fig. 2, wherein driving lugs 10 and 11 coact with driven lugs 12 and 13 through cantaliver spring members 22 and 23, the latter differing but little from the corresponding members of Fig. 1, except in their method of mounting. A binding member 24 surrounds the leaves of a spring 22 and, in like manner, a binding member 25 surrounds the leaves of a spring 23. The binders 24 and 25 are provided with integral lugs 26 and 27 that are adapted to be seated in openings in a large binding ring 28 surrounding the entire spring structure. A wedge member 29' is fitted between the binders 24 and 25 to force them out into firm engagement with the ring member 28.

In assembling the structure thus described, the driving and driven lugs are first disposed in relative space quadrature, the binder 28 is introduced from the side of the coupling and the springs 22 and 23 slipped down thereinto. The wedge member 29 is then inserted, forcing apart the central portions of the cantaliver springs and making up the double-spring structure shown. The tip of the wedge may be upset, as shown, and the wedge may be readily removed for the inspection of the springs. I have shown removable bearing members at 30 so that, as the springs tend to wear the lugs, the wearing faces of the latter may be renewed.

When operating a coupling of the character just described, particularly at high speeds, there is a tendency for the individual leaves to become loosened and thrown out by centrifugal force and, to overcome this tendency, I have devised the double cantaliver structure shown in Figs. 3 and 4. Two double cantaliver spring members 31 and 32 are mounted in back-to-back relation, each individual leaf being provided with lateral extensions at its center portions. as shown at 33 in Fig. 3. A binding member 34 surrounds all the spring leaves at one side of these lugs, and a similar binding member 35 surrounds them at the other side thereof, the binding members 34 and 35 being provided with semi-cylindrical bosses or extensions at their central portions, as shown at 36—37 in Fig. 3. Binding members 38—38 surround the bosses 36—37 clamping them securely together and thus rigidly clamping the entire spring structure, the rings 38—38 further providing cylindrical bearing surfaces for the mountings of the springs, as will hereinafter more fully appear.

Turning to Figs. 5, 6 and 7 for a device showing the springs, just described, in use, two opposed coupling members 14 and 39 are employed as before and as shown in detail in Fig. 6, these coupling members being mounted on the ends of shafts 401 and 410, respectively. The coupling member 14 is provided with lugs 12 and 13 and, likewise, the coupling member 39 is provided with driving lugs 10 and 11. All these lugs are preferably quadrant shaped so as to jointly provide two large passages through the coupling structure, these passages having parallel walls, all as shown at 40 and 41 in Figs. 5 and 7. A spring element 42, of the form shown in Figs. 3 and 4, is mounted in the passage 40, and a similar spring element 43 is mounted in the passage 41. The sides of the respective lugs are provided with seats 44 for the reception of the ends of the springs, in order to lock the entire structure more firmly together, and the bottoms of these seats may be provided with renewable wearing plates, as shown in Fig. 7, if desired.

Each of the coupling members 14 and 39 is provided with a centrally disposed depression, as shown at 45 and 46, and the appropriate binding ring 38 of the immediately adjacent spring element is seated therein, as shown in Fig. 6, thus largely limiting the springs from undesirable movement. The immediately adjacent binding rings 38 of the two spring elements are surrounded by a ring member 47, thus serving to maintain mechanical alinement between the two spring elements.

For the insertion of the spring elements in the desired seats, it is necessary that they be somewhat tightly compressed and, to this end, the spring members may be provided with forked extensions at their tips, as shown at 48, and turn-buckles 51 may be inserted between opposite tips in order to compress the springs to the desired amount.

The operation of the structure shown in Figs. 5, 6 and 7 is readily apparent from the foregoing description of the apparatus shown in Figs. 1 and 2, particular attention being directed to the fact that high-speed operation is permissible without danger of the disengagement of spring leaves.

If desired, small auxiliary lugs 49—49 may be placed upon the coupling member 14 in such manner that, at light loads, a considerable space intervenes between these lugs and the driving lugs 10 and 11 of the coupling member 39. If the driving lugs 10 and 11 rotate in a counter-clockwise direction, as indicated by arrow 50 in Fig. 5, and if a heavy load be imposed upon the coupling, the deflection of the spring elements permits the lugs 10 and 11 to engage the auxiliary lugs 49, resulting in a rigid drive and in the release of the spring members from more excessive strain, thus protecting the spring members from overstrain and possible breakage.

While I have disclosed my invention in several of its desirable forms, it will be obvious to those skilled in the art that it is not so limited but is susceptible of various minor changes and modifications without departing from the spirit thereof and I desire, therefore, that only such limitations shall be placed thereupon as are imposed by the prior art or as are specifically set forth in the appended claims.

I claim as my invention:

1. In a flexible coupling, two sets of cantaliver springs disposed in side-by-side relation and having relative rotative movement.

2. In a flexible coupling, two independent sets of cantaliver springs disposed in side-by-side relation and both pivotally mounted about substantially the same axis.

3. In a flexible coupling, two sets of resilient power-transmitting devices each comprising two double cantaliver leaf-spring units mounted in fixed relation to each other, said two sets of devices being pivoted about the same axis but not in operative relation with each other.

4. In a flexible coupling, two sets of resilient power-transmitting devices mounted in side-by-side relation and each comprising two double cantaliver leaf-spring units the central portions of which are disposed in fixed relation to each other, and means for holding said sets in alinement.

5. In a flexible coupling, two independent sets of resilient power-transmitting devices mounted in side-by-side relation and each comprising two double cantaliver leaf-spring units the central portions of which are disposed in fixed relation to each other, and means for holding said sets in alinement.

6. In a flexible coupling, the combination with two abutting coupling members, each of which is provided with two quadrant shaped lugs on their opposing faces, said lugs overlapping each other and being of such size as to afford two diametral passages through said coupling structure at right angles to each other, of a spring unit comprising two back-to-back double cantaliver springs loosely pivoted in each passage, said springs frictionally engaging said lugs.

7. In a flexible coupling, the combination with two abutting coupling members, each of which is provided with two quadrant shaped lugs on their opposing faces, said lugs overlapping each other and being of such size as to afford two diametral passages through said coupling structure at right angles to each other, of a spring unit comprising two back-to-back double cantaliver springs loosely pivoted in each passage, said springs frictionally engaging said lugs and the spring units normally tending to have a greater width than the passage therefor, and compressing means for reducing the size of said springs sufficiently to permit their insertion into said passages.

8. In a flexible coupling, the combination with two abutting coupling members, each of which is provided with two quadrant shaped lugs on their opposing faces, said lugs overlapping each other and being of such size as to afford two diametral passages through said coupling structure at right angles to each other, of a spring unit disposed in each of said openings comprising two back-to-back double cantaliver springs, said springs frictionally engaging said lugs, and each spring unit being provided with a centrally disposed lug disposed within an opening centrally disposed with respect to all of said coupling-member lugs whereby said spring units are individually loosely pivoted in place.

9. In a flexible coupling, the combination with two abutting coupling members, each of which is provided with two quadrant shaped lugs on their opposing faces, said lugs overlapping each other and being of such size as to afford two diametral passages through said coupling structure at right angles to each other, of a spring unit disposed in each of said openings comprising two back-to-back double cantaliver springs, said springs frictionally engaging said lugs, and each spring unit being provided with a centrally disposed lug disposed within an opening centrally disposed with respect to all of said coupling-member lugs and said spring units further being mechanically interlocked with each other at their zone of intersection whereby said spring units are individually loosely pivoted in place.

10. In a flexible coupling, the combination with two abutting coupling members, each of which is provided with two quadrant shaped lugs on their opposing faces, said lugs overlapping each other and being of such size as to afford two diametral passages through said coupling structure at right angles to each other, of a spring unit comprising two back-to-back cantaliver leaf springs, each leaf being provided with centrally disposed lugs, binding members surrounding said springs on each side of said lugs, respectively, and each having a semi-circular lateral extension, said extensions together forming a laterally extending cylindrical boss, and a ring member surrounding said boss for clamping said binding members together, said ring member being seated in an opening in the immediately adjacent coupling member, whereby each spring unit is firmly clamped together and loosely pivoted in place.

11. In a flexible coupling, an energy-transmitting spring member provided with a relatively fixed support, a driving member adapted to engage the spring member at a point remote from its support, and means whereby the active moment arm of the spring is decreased as the driving force increases.

12. In a flexible coupling, an energy-transmitting spring of the cantaliver type, and supporting means therefor, said supporting means being arranged to shorten the active-moment arm of said spring with increases in the deflection thereof and vice versa.

13. In a flexible coupling, the combination with two opposing coupling members provided with overlapping lugs disposed in spaced relation with respect to each other, whereby diametral passages are provided through said coupling, of energy-transmitting devices inserted in said passages and respectively comprising two double cantaliver springs mounted in back-to-back relation and frictionally engaging the faces of said lugs, the point of initial engagement at light load being near the end of each spring member and moving inward as the load is increased, whereby the active moment arm of each spring is decreased with an increase of load and vice versa.

14. In a flexible coupling, an energy-transmitting aggregate comprising two sets of springs each comprising two double cantaliver springs mounted in back-to-back relation, each spring reacting against the other spring of its own set only when transmitting energy.

15. In a flexible coupling, two opposed coupling members provided with overlapping lugs on their adjacent faces of energy-transmitting means therebetween comprising two double cantaliver springs mounted in back-to-back relation and frictionally engaging said lugs, the point of engagement of said springs on said lugs traveling inward on said springs as the load is increased and vice versa, whereby the deflection of said springs with a unit increment of load becomes less and less with increase of load, and stop members on said coupling members adapted to come into engagement when said spring members are deflected more than a predetermined amount, whereby the overstraining of said spring members is prevented.

16. A composite spring structure comprising a plurality of sets of energy-transmitting devices each comprising two double-cantaliver aggregates mounted in back-to-back relation, each of said aggregates comprising a plurality of leaves, means for binding said aggregates together into sets, said binding means also preventing the longitudinal movement of the leaves in said aggregates, and means for maintaining said sets in alinement without transmitting energy therebetween.

17. A composite spring structure comprising two double-cantaliver aggregates mounted in back-to-back relation, each of said aggregates comprising a plurality of leaves, each leaf having transversely extending lugs at its mid portion, binding means surrounding said aggregates on each side of said lugs, respectively, and means joining said binding means together, whereby said aggregates are joined and the longitudinal movement of individual leaves therein prevented.

18. A composite spring structure comprising two double-cantaliver aggregates mounted in back-to-back relation, each of said aggregates comprising a plurality of leaves, each leaf having transversely extending lugs at its mid portion, binding means surrounding said aggregates on each side of said lugs, respectively, and rings joining said binding means, said rings furnishing cylindrical bearing surfaces for the mounting of said spring structure.

19. A composite spring structure comprising a plurality of equitant leaf members, each embodying laterally extending lugs at its mid-portion, a binding member surrounding said leaf members on each side of said lugs, respectively, and means joining said binding members, whereby the longitudinal movement of individual leaf members with respect to said spring structure is prevented.

In testimony whereof, I have hereunto subscribed my name this 31st day of Oct., 1918.

GEORGE M. EATON.